$\equiv L abc \lor L de = x'$

INVENTORS
Wolfgang Händler
Roland Maier
Johannes Martin
Otto Müller
Heinz Voigt &
Karl Voitel BY *Spencer & Kaye* ATTORNEYS INVENTORS
Wolfgang Händler
Roland Maier
Johannes Martin
Otto Müller
Heinz Voigt &
Karl Voitel
BY
Spencer & Kaye
ATTORNEYS INVENTORS
Wolfgang Händler
Roland Maier
Johannes Martin
Otto Müller
Heinz Voigt &
Karl Voitel BY Spencer & Kaye ATTORNEYS

United States Patent Office 3,268,871
Patented August 23, 1966

3,268,871
COMPUTER CONTROL DEVICE
Wolfgang Händler, Volklingen-Geislautern, Roland Maier, Frankfurt, Johannes Martin, Essen (Ruhr), Otto Müller, Konstanz, and Heinz Voigt and Karl Voitel, Backnang, Germany, assignors to Telefunken Patentverwertungs-G.m.b.H., Ulm (Danube), Germany
Filed Aug. 23, 1962, Ser. No. 218,873
Claims priority, application Germany, Aug. 25, 1961,
T 20,653
23 Claims. (Cl. 340—172.5)

TABLE OF CONTENTS

| Section | Column |
|---|---|
| I. Introduction | 1 |
| II. Objects of the Invention | 2 |
| III. Brief Description of the Invention | 2 |
| IV. Brief Description of the Drawings | 3 |
| V. Detailed Description of the Invention | 3 |
|    A. Program Controlled Digital Computer, FIGURE 1 | 3 |
|    B. Principle of the Control Device, FIGURE 2 | 4 |
|    C. Bistable Elements Functioning as Register and Power Elements, FIGURES 3 and 4 | 5 |
|    D. Construction and Operation of the Control Device, FIGURE 7 | 6 |
|    E. Microprogram Using a Nanoprogram Chain, FIGURE 8 | 7 |
|    F. Microprogram Without a Nanoprogram Chain, FIGURE 9 | 8 |
|    G. Simultaneous Operation | 8 |
|    H. Microprogram Used as a Nanoprogram | 9 |
|    I. Operation | 9 |
|       (1) Algebraic Representation of Logic Circuits | 10 |
|       (2) Definition of Symbols in the Drawings | 10 |
|       (3) Identification of Elements | 11 |
|       (4) Operation of a Control Device | 11 |
| VI. Summary | 14 |
| VII. Appendix | 14 |

I. INTRODUCTION

The present invention relates generally to the computer art, and more particularly, to a new and improved control device for a program controlled digital computer.

All program controlled digital computers include at least one functional section capable of performing organization or arithmetic operations, such as an arithmetic unit. Such computers further include a functional section which retains information in a ready and available state so that the arithmetic unit may be provided with information from this functional section and may transfer information to this functional section, such as an input unit, an output unit, and/or a storage unit. These computers further include a functional section for controlling the information traffic between these units as well as the function of these units, such as a command unit.

A further development of the computer is the provision of a control device which assumes the control functions of the command unit and, in turn, handles the command unit as a passive functional section of the computer in the same manner as all of the other units. In this case general organization operations and all address calculations are performed in the command unit.

Such a control device for a program controlled digital computer is supplied with commands usually together with one or more addresses indicating operands. Such comands are provided from a storage unit or an input/output unit. The command unit is provided with a command register for storing the command signals which are usually presented in electrical binary form. This register is formed of bistable register elements, for example, flip-flops or magnetic core devices having rectangular ferrites. After a command has been performed, a finish signal causes transfer of the following command into the command register and in fast computers this transfer is prepared while the preceding command is being performed.

The contents of the command register is fed to a decoding device which is provided for the control device and which, in turn, controls one or more operation elements which make possible elemental operations, such as, for example, the logical connection of several registers in a computer, the transfer of information, or similar operations.

For many computers the decoding and encoding device which is a purely passive logic network is not sufficient for command decoding. In many cases, it is desirable to trigger several elemental operations by means of a single command. These operations are not all to take place simultaneously, but in a predetermined sequence, for example, the command "add" in parallel computers means: form the cyclic sum of the operands and simultaneously carry information, while subsequently removing the carry.

In order to do this it is known to control a continuous or sequential switching chain instead of an elemental operation. Such a chain is switched by means of the computer clock and/or its own chain members. In this manner the elemental operations are triggered by the individual members of the continuous switching chain. A known control device of this type uses magnetic bistable circuits as members of the continuous switching chains and includes a continuous switching chain for each command with chronologically successive elemental operations. It can be seen that a control device of this type is not constructed for optimum conditions especially with respect to the large expense which it entails.

Another system is described in "Elektronische Rechenanlagen" (Electronic Computers), March 1960, page 117 ff., FIGURE 13. In this arrangement which may be thought of as a two-dimensional coordinate system constructed of only two continuous switching chains, the operation elements to be controlled simultaneously are arranged in a further dimension and are selected by means of one member, respectively, of both of the continous switching chains. Such an arrangement provides a substantial saving in continuous switching chains.

II. OBJECTS OF THE INVENTION

With these features of the prior art in mind, a main object of the present invention is to provide a control device for a program controlled digital computer having further advantages over the above-described devices and which may be provided at less expense.

Another object of the instant invention is to provide a control device of the character described wherein various microprograms may selectively utilize other microprograms, to simplify the programming of the computer.

A further object of the present invention is to provide a control device which controls microprograms in such a manner that individual nanoprograms may be used in a plurality of microprograms in order to simplify operation and programming of the computer and render it more versatile.

III. BRIEF DESCRIPTION OF THE INVENTION

These objects and others ancillary thereto are accomplished according to preferred embodiments of the present invention wherein a control device having bistable operational elements and a command register in a command unit of the computer are provided. In this command unit an N-digit command is to be carried out and, if desired, one or more information addresses are stored in the form of binary command signals. In this control device, the bistable operation elements are controlled on the basis of a combination of command signals in the command section of the command register by means of a decoding device, to cause elemental operations. In order to carry out a command it is usually necessary to perform several elemental operations simultaneously and chronologically or sequentially; this is a so-called microprogram. Thus, the various operational elements are connected with different members of continuous switching chains corresponding to the decoding device. These switching chains include bistable elements with program controlled succession of members, so that only the first member of such a continuous or sequence switching chain is selected by means of the command decoding.

According to the present invention, the decoding device, in addition to the continuous switching chains, is provided with several bistable operation elements so that one of $2^N$ microprograms is chosen by selecting the first member of one of $2^n$ continuous switching chains in dependence upon a first partial group of $n$ command signals, and by selecting one of the $2^{N-n}$ microprograms connected to a continuous switching chain by means of one or more conditional elements.

These conditional elements are activated in dependence upon a second partial group of $N-n$ command signals and remain activated or switched in during performance of the command.

IV. BRIEF DESCRIPTION OF THE DRAWINGS

Additional objects and advantages of the present invention will become apparent upon consideration of the following description when taken in conjunction with the accompanying drawings in which.

V. DETAILED DESCRIPTION OF THE INVENTION

Figure 1:
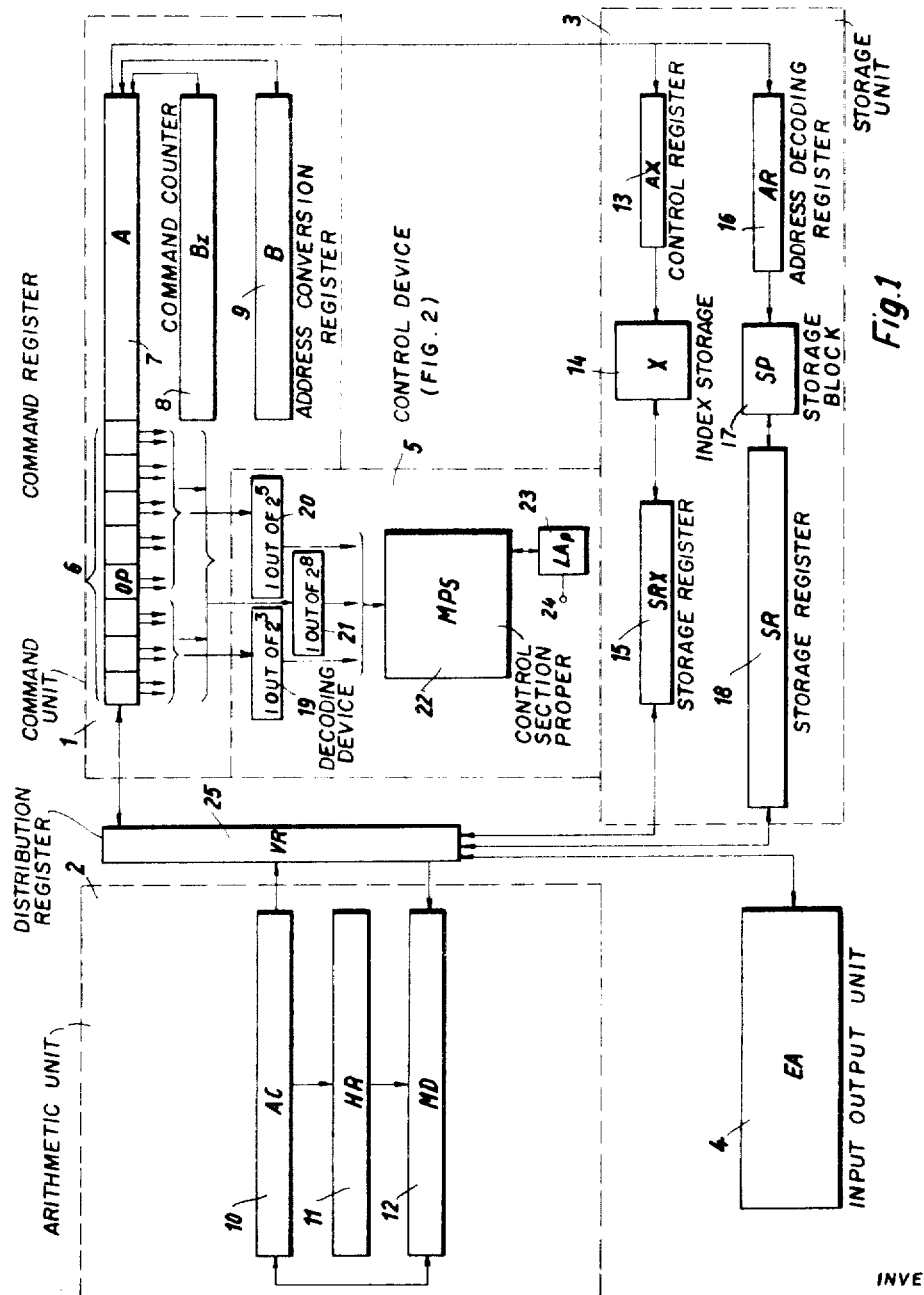
FIGURE 1 is a block diagram illustrating the principle of a program controlled digital computer.

A. *Program controlled digital computer, FIGURE 1*

With more particular reference to FIGURE 1, the most important functional sections of the computer under consideration are diagrammatically shown. A command unit 1, an arithmetic unit 2, a storage unit 3, an input/output unit 4, and a control device 5 are connected to cooperate in a known manner. The paths of information indicated by arrows are incomplete and are only symbolical in nature. The processing and the transfer of a word (group of binary signals) are carried out simultaneously (in parallel) in the example shown.

The command unit 1 contains a command register 6, 7, which includes the operation or instruction register OP (6) and the address register A (7). The operation register OP, which in the present case has eight register elements, contains, in coded form, the operational part of a command to be presently carried out. The address register A contains the address of the command for the storage unit control. Furthermore, a command counter Bz (8) is provided in the command unit 1 which increases the address continuously by 1. Also, a register B (9) is provided in the command unit for address conversions.

The arithmetic unit 2 includes three registers AC (10), HR (11) and MD (12). The storage unit 3 includes an index storage means X (14) with the control register AX (13) for address decoding pertaining thereto, and with the storage register SRX (15) also pertaining thereto. Further included are a storage block SP (17) with address decoding register AR (16) and storage register SR (18). Information is fed to the computer or extracted from the computer by the input and output portions, respectively, of unit EA (4).

The functional section comprising the present invention is the microprogram control device 5 with the decoding devices 19, 20, and 21; an operation element $LA_p$ (23); and the control section proper MPS (22) containing the continuous switching chains and the conditional elements, this control section controlling the chronological sequence of all commands. The operation element 23 is controlled at the start of the operation of the computer by the connecting terminal 24, simultaneously with the input/output unit 4. This operation element sets the microprogram control device 5 into operation.

A distributor register VR (25) transfers information between the individual units and briefly, in an intermediate sense, stores information. The command register 6, 7 possesses the same capacity as the arithmetic unit registers 10, 11, 12, the storage register 18, and the distributor register 25. The computer under consideration is assumed to be capable of carrying out $2^N$ different commands or microprograms. In order to designate the same, N binary digits or positions are thus provided in the command section of the command register. In the example to be described $N=8$.

Figure 2:
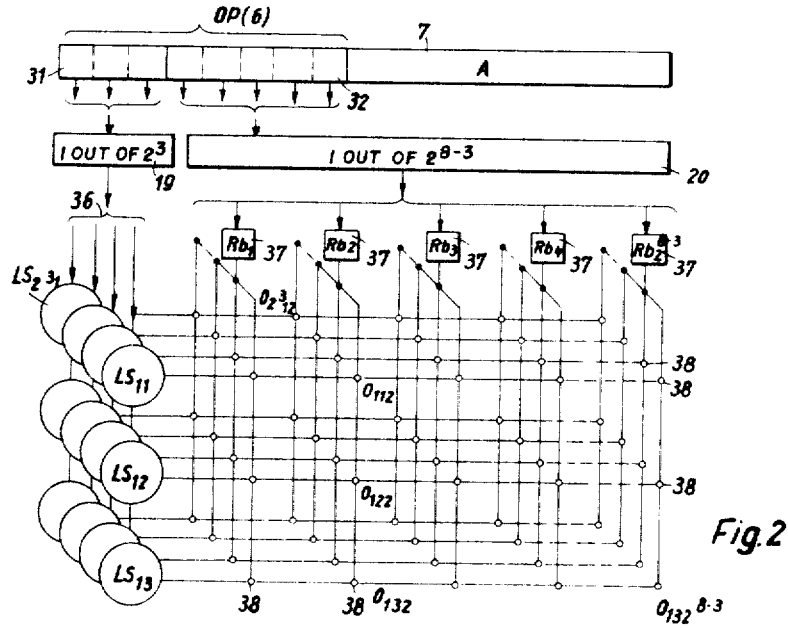
FIGURE 2 is a schematic view of a control device illustrating the principle of operation according to the present invention.

B. *Principle of the control device, FIGURE 2*

In FIGURE 2, the command register of FIGURE 1 (6, 7) is shown as being divided into three boxes representing sections 31, 32, and 7, of which 31 and 32 designate the instruction section OP and 7 designates the address section A. Corresponding elements in FIGURES 1 and 2 are indicated by the same reference numerals. The number and the length of the addresses are of no significance for the present discussion and in the following description the address portion need no longer be considered.

The 8-digit command portion is divided into a first partial group 31 of $n$ command signals which, in the example illustrated is 3, and a second partial group 32, having the remainder of the command signals. Corresponding to this distribution, two devices 19 and 20 for decoding "1 out of $2^3$" and "1 out of $2^{8-3}$" are provided so that one of $2^3$ or 8 continuous switching chains 36 and one of $2^{8-3}$ or 32 conditional elements 37 are switched in by each command. For purposes of clarity all of these are not shown. Each continuous switching chain Sa, where $a$ is a number between 1 and $2^3$ or 8, includes three chain members $LSa1$, $LSa2$, and $LSa3$, but this number is merely used as an example and in practice will usually be larger. The individual members of one chain are advantageously not fixedly connected with each other, but are advanced in a sequence depending upon the program.

The practical embodiment of such chains will be described below. The device 19 selects one of the $2^3$ continuous switching chains on the basis of the first partial group 31 of the command signals, that is, a preferred member of one chain. This chain member, and any other, is capable of controlling several operation elements which, in turn, make the operations possible. In FIGURE 2, several operation elements to be switched in simultaneously within a microprogram are symbolically illustrated by means of a small circle 38. This structure can be thought of as a spatial network which is constructed of such little circles, whereby one of the $2^3$ planes lying parallel to the plane of the drawing is selected by device 19, while the $2^{8-3}$ conditional elements 37 control a column and the respective position of the continuous switching chain controls a row. Thus, exactly one microprogram is wired into a vertical column of one plane and such microprogram is selected by a conditional element 37, for example, R$b_2$, and a continuous switching chain, for example, S1. In this exemplary microprogram, three different stations or positions with respectively several elementary operations are possible: $O_{112}$, $O_{122}$, and $O_{132}$.

From a consideration of this schematic view of the principle involved, important features of the invention already become apparent. Each microprogram has exactly one column in one plane, i.e., it is fixedly connected with a continuous switching chain and with a conditional element. Further switching within one microprogram is carried out by means of only one continuous switching chain. Thus, far fewer continuous switching chains are provided than possible commands. Predetermined groups of command signals are assigned to the continuous switching chains 36 and to the conditional elements 37, respectively, so that several microprograms which are to be combined into groups in accordance with any desired considerations, are controlled by one conditional element or by one chain, and thus possess a similar command code.

Figure 3:
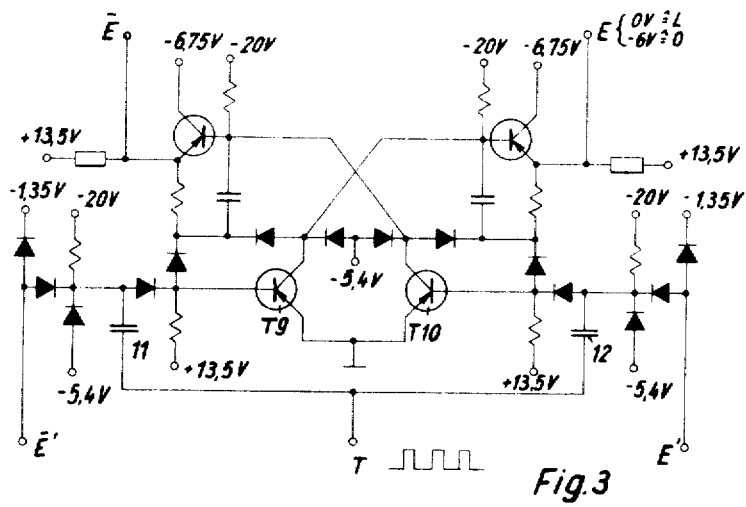
FIGURE 3 is a circuit diagram of a known bistable element which is a register element.
Figure 4:
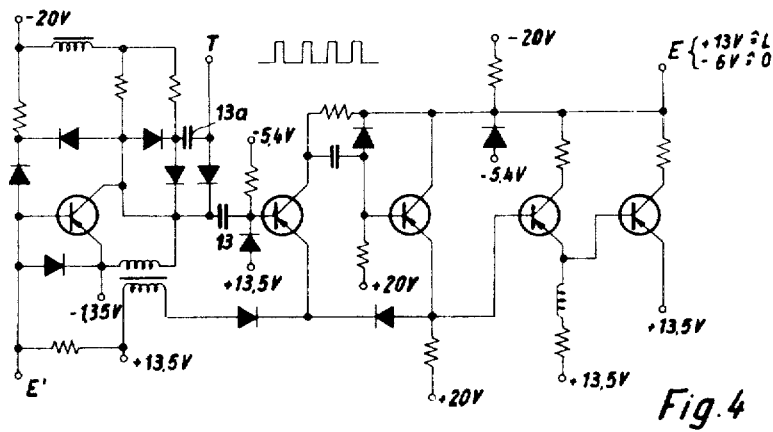
FIGURE 4 is a circuit diagram of a known bistable element which is a power element.

C. *Bistable elements functioning as register and power elements, FIGURES 3 and 4*

In FIGURES 3 and 4, two kinds of bistable elements are shown which may be incorporated in a practical construction for utilizing the principle illustrated in FIGURE 2. FIGURE 3 shows a known bistable element having the transistors T9 and T10 arranged in an Eccles-Jordan circuit. The circuit has two information inputs E′ and $\overline{E'}$, a clock pulse input T, and two information outputs E and $\overline{E}$, as well as two storage capacitors 11 and 12 whose charge, which is dependent upon the input information, is interrogated by the clock pulse. If, at a certain instant, an input pulse corresponding to logical ONE is present at the input E′, the bistable element is brought into condition ONE by the next clock pulse, so that a voltage corresponding to logical ONE is present at output E, and a ZERO voltage is present at output $\overline{E}$. This condition is provided by a positive potential of output E in comparison with $\overline{E}$. The clock pulse by itself is not capable of changing the element.

In FIGURE 4, a similar known bistable element is illustrated which has only one input E′ and one output E for information, as well as a clock pulse input T and storage capacitors 13 and 13$a$. A ONE voltage will appear at output E only when the capacitor 13 has been charged by the input E′ and a clock pulse is present. If only the necessary clock pulse is present, the element is again put into condition ZERO via the capacitor 13$a$ and the emitter of a transistor of the bistable circuit, it being noted that the more positive voltage shall always be considered to mean the ONE voltage.

Figure 5:
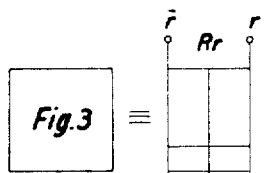
FIGURE 5 is an explanatory view indicating the block symbol which is used in the following drawings to indicate the register element.
Figure 6:
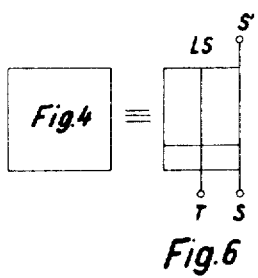
FIGURE 6 is an explanatory view indicating the block symbol which is used in the following drawings to indicate the power element.

This brief description of these elements is sufficient since they do not per set form the present invention and are generally known. In the following description, the element according to FIGURE 3 will be called register element R, and the element according to FIGURE 4 will be called power element L; the former is symbolically illustrated, in the following FIGURES 7 through 11, as a rectangle with four terminals (see FIGURE 5), while the power element is indicated by means of a rectangle with two terminals (see FIGURE 6).

Figure 7:
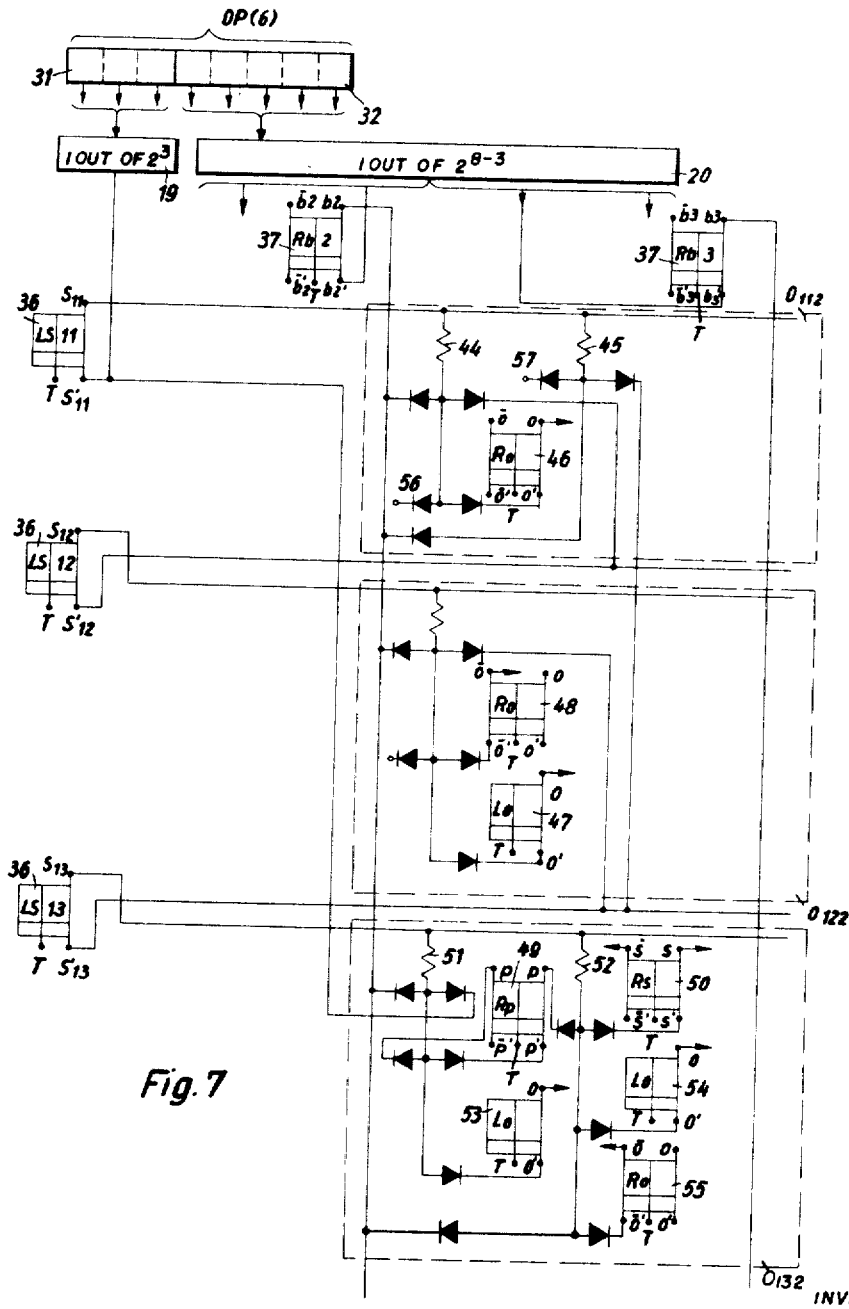
FIGURE 7 is a block diagram partially in schematic representation indicating a portion of the control device of FIGURE 2.

D. *Construction and operation of the control device, FIGURE 7*

The power and register elements, in various combinations with resistors and diodes and with the use of diode logic, form the control device indicated in FIGURE 2, and a section of this control device is shown as a practical embodiment in FIGURE 7. The illustration is confined to one plane, i.e., to one continuous switching chain S1 and even to only one microprogram which is controlled by the conditional element R$b$2. The three lattice points from FIGURE 2, $O_{112}$, $O_{122}$, $O_{132}$, correspond to the circuit shown in FIGURE 7.

The first partial group of command signals selects the first power element LS11 of the first continuous switching chain through the decoding circuit 19. Two conjunction resistors 44 and 45 are connected with the output of this first power element. They respectively lead to the conjunction point of a known AND-circuit. The diodes pertaining thereto are connected to the conditional register element R$b$2 and are connected for fulfilling additional conditions, depending upon a former program, upon the position of the arithmetic registers, or upon similar facts. The terminals for these additional conditions are designated 56 and 57. The output of the AND-circuit is constituted by the conjunction point proper and is, in turn, effective as the input of a succeeding OR-circuit whose working or operating resistance is in the input circuit of the succeeding bistable elements. The first switching circuit with the resistor 44 switches in the second power element of the continuous switching chain LS12 and a register element 46 if LS11 and R$b$2, as well as the additional condition 56, have positive output potential. On the other hand, when fulfilling the other additional condition (terminal 57 positive) the second connection circuit (with the resistor 45) is activated and no operation element, but only the third chain member LS13 is activated, LS12 being by-passed.

The brief exemplary program is continued in the first case, by changing the second member LS12 of the continuous switching chain to ONE by means of the succeeding clock pulse, while the first chain member is deactivated in a conventional manner by means of the clock pulse. In this step, two further elements 47 and 48 which are a power element and a register element, respectively, are activated or switched in without any additional conditions, and the third member of the continuous switching chain is prepared. This third member could, if desired, already be controlled before this step by LS11 via resistor 45. In the third step, two possibilities are provided, i.e., there is conditional operation and a register element 49 varies the program. After the switching chain has been cycled twice, the microprogram is assumed to be finished, and a final signal element 50 is set. At the beginning of the program, element 49 is assumed to be at condition ZERO; then the conjunction device with the resistor 51 is switched in, but not the conjunction device with the resistor 52. A power element 53 and the register element 49 are prepared and the jump to the first member LS11 of the continuous switching chain is performed. After that, the above described program begins again and, at the end, the power element 53 is not activated, but two other elements, power element 54 and register element 55, as well as the final signal element 50 are set, because the element 49 was in condition ONE.

The control device described thus far may be varied substantially, and one of the many advantageous variations will be discussed. Of the $2^8$ (256) microprograms, some programs resemble each other, for example, the addition, subtraction, sum addition, and sum subtraction. For a complete coordination of such programs, the principle previously described is somewhat modified and the second partial group of command signals 32, which up to now determined one of the conditional elements 37, is once more divided. One or two (considered generally $m$) command signals are branched off, and they form, and/or control, modification elements which represent additional conditions in the manner described in connection with FIGURE 7, e.g., terminals 56 and 57. By means of these modification elements, several similar microprograms present at a continuous switching chain and a conditional element are differentiated from one another with respect to the different portions of their programs, so that the modification elements thus are interrogated only in such different portions.

For better supervision of the operation, it is desirable that all continuous switching chains possess the same number of members. However, some microprograms require more members than is provided in a chain and, in such cases, the conditional element set by the decoding in step is canceled in the last step of the first chain. In place of this, a register element is switched in as a chain lengthening element, and an extension chain, as well as a further conditional element are controlled. The chain lengthening element is effective as an additional condition in the sense of terminal 56 in FIGURE 7 in all steps of the succeeding chain and has to be canceled at the end of the program. The extension chain may be any desired other chain, or it may be the same continuous switching chain; the command register is not changed in the course of this extension.

Thus, in this case, the chain extending elements which can be used by all chains, are required in addition to the $2^N-n$ conditional elements provided by the decoding device.

The control device according to the invention proves especially advantageous in the processing of frequently occurring sub-routines, so-called nanoprograms. Such program portions which are not independent commands may be applied to one or several additional continuous switching chains, which cannot be controlled via the command decoding step.

Figure 8:
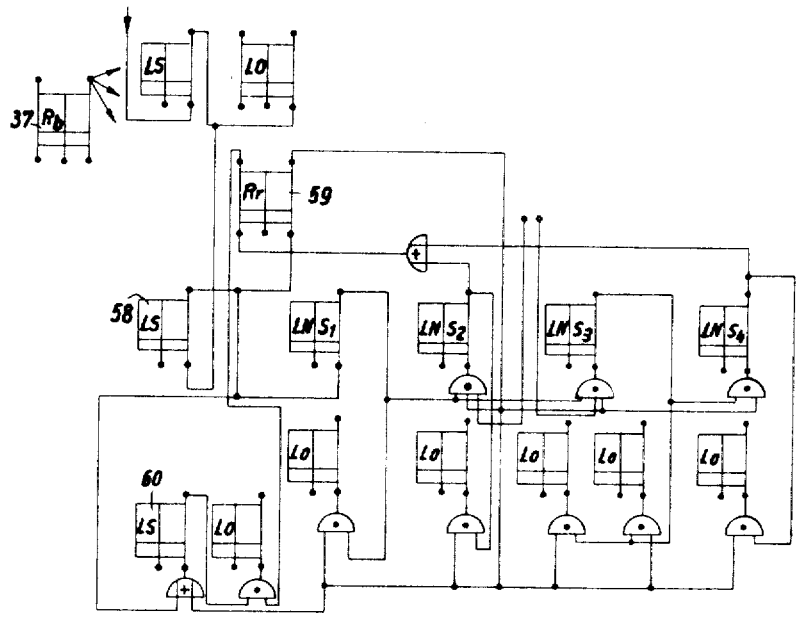
FIGURE 8 illustrates one embodiment of a decoding device in accordance with the present invention.

E. *Microprogram using a nanoprogram chain, FIGURE 8*

FIGURE 8 shows, in the usual logical representation, a portion of a microprogram in which a nanoprogram is employed. The members of a nanoprogram chain which cannot be controlled directly by the command register are designated LNS1 to LNS4. LS are the members of a normal continuous switching chain, LO are power elements, and R$b$ designates the conditional elements 37. At the instant being considered, this conditional element is in ONE condition together with the member 58 of the normal continuous switching chain. In place of an operation element, the member LNS1 of a nanoprogram continuous switching chain is controlled, and for differentiating between several nanoprograms on one nanoprogram continuous switching chain, a register element 59 is set as a nanoprogram element which is analogous to the conditional element in the microprogram. After this, a nanoprogram is carried out with all of the possibilities which are already known from considering the microprogram. In the example illustrated, a conditional jump from LNS1 to LNS3 is provided and whose condition is set, for example, by the superior microprogram. In dependence upon this, either LNS1, LNS2 or LNS1, LNS3, LNS4, are subsequently activated. With the last step LNS2 or LNS4, element 59 is again canceled so that processing of the microprogram may proceed.

Since several microprograms may employ one nanoprogram, the return from the nanoprogram to the correct microprogram has to be arranged. This may be done, for example, by making each of these microprograms set a certain number of register elements provided for this purpose when jumping into the nanoprogram. Also the nanoprogram, in its last step, and in dependence upon these register elements, activates by setting a certain member of its continuous switching chain and a certain one of its conditional elements, only that microprogram from which the jump into the nanoprogram was made. This requires:

(1) The register elements themselves;
(2) The particular characteristic setting of these register elements by all microprograms involved; and
(3) The complicated decoding jump from the nanoprogram.

A simplication of this return from the nanoprogram is provided according to the invention, in that the superior microprogram, simultaneously with its advance into the nanoprogram, advances, for example, to the next member 60 of its continuous switching chain and there controls this member during the course of the nanoprogram as long as the nanoprogram element 59 is set. The operation which is connected with the member 60 is arranged to become effective only when the nanoprogram, in the last step, has canceled its nanoprogram element 59. Then, the nanoprogram, after it has run its course, need cancel only its own nanoprogram element, since only the superior microprogram which had been waiting is continued.

Under certain conditions which will be explained below, the nanoprogram and the microprogram may be carried out simultaneously, if simultaneous operation of several units of the computer is possible. The waiting period in this case may take place at a subsequent member of the microprogram continuous switching chain.

A further return is provided wherein the nanoprogram, in its last step, controls the superior microprogram by renewed decoding of its operation code which is still present in the command register.

Figure 9:
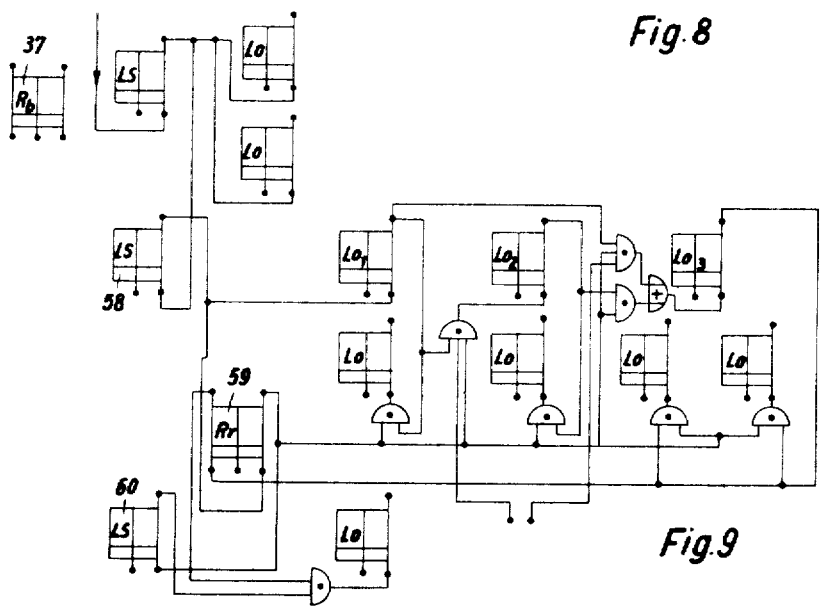
FIGURE 9 illustrates another embodiment of a decoding device according to the instant invention.

F. *Microprogram without a nanoprogram chain, FIGURE 9*

In FIGURE 9, an arrangement having a function similar to that of FIGURE 8 is illustrated. However, this arrangement omits the members of the nanoprogram chain. The reason for this is that since operation elements, as well as the members of the chains, may be constructed of power elements according to FIGURE 4, the chain members may be replaced by operation elements. However, a fixed sequence of operation can only be provided if the operation elements serving for continuous switching all differ from one another, as well as from the other operation elements of the nanoprogram, which often is the case in simple programs.

G. *Simultaneous operation*

The control device according to the present invention is also well suited for fast computers having simultaneous operation. Such computers have several units for processing the bits of information, for example, several arithmetic units, or one arithmetic unit, one control unit, and a storage unit. In order to increase the speed of the processing of information, it is desirable that several units operate simultaneously. According to the invention, microprograms for the above mentioned purpose are differentiated in accordance with the unit or units which they use.

In an example to be described below, a distinction is made between microprograms which are processed only in the command unit and in the storage unit, e.g., jump commands, commands for address computations, substitution commands, and word group transfer commands within the storage device, and the remainder of the microprograms which are processed in the arithmetic unit. According to the invention, microprograms of the first type are connected exclusively to one or two continuous switching chains so that in the latter case the first $(n-1)$ command signals indicate the type of command. Further, the conditional elements 37 and the modification elements are provided in duplicate whereby the first group only affects continuous switching chains which are associated with the independently operating microprograms, while the other group cooperates with the other chains.

Thus, if a microprogram of the first-mentioned type has started, the next following command is transferred into the command register, and an examination determines whether this command permits simultaneous operation. If it does, then the register element for indicating simultaneous operation is automatically activated and the second command is decoded partially to the continuous switching chains and partially to the corresponding group of conditional elements and modification elements, whereby the choice as to which group is selected is determined from the first command signal. Now, two continuous switching chains work simultaneously to process different programs.

It is also advantageous (1) to apply such microprograms to a special continuous switching chain and which only initially use several units, and then continue to operate an independent unit, or (2) provide such microprograms which initially use an independent unit and subsequently no longer permit simultaneous operation. In such cases, a waiting period is interposed and the simultaneous operation element is canceled or set when the simultaneous operation must end or may begin, respectively.

However, with this type of operation, upon the cancellation of the simultaneous operation element, one of the two programs being performed should receive superiority over the other, while the remaining program is placed into a waiting period or loop which is controlled until certain conditions for further processing are fulfilled. In the present example, these conditions are, for instance, the missing final signal of the superior program, or the "off" condition of the simultaneous operation element.

H. *Microprogram used as a nanoprogram*

The control device of the present invention may use a microprogram as a nanoprogram. Previously, a microprogram was understood to mean a succession of elemental operations, the first of which is controlled by decoding the command section of the command register to a first member of a continuous switching chain. This definition must be more precise for the present type of operation since a microprogram may be initiated from the command register, while a nanoprogram must be initiated or controlled by another microprogram or nanoprogram. In this sense the terms "command" and "microprogram" also have to be differentiated. Each microprogram carries out, perhaps together with nanoprograms, just one simple command; but complicated commands use, if required, several microprograms.

If it is desired to operate a microprogram as a nanoprogram, e.g., the microprogram "addition" within the scope of a microprogram "vector addition," then a reasonable transition must be provided at the beginning and at the end of the subordinate microprogram. If a microprogram is controlled in a subordinate manner, the first member of the new continuous switching chain, the conditional element, and the modification elements are activated by the superior program, while the conditional element and the modification elements for the superior program are canceled. Finally, a new register element, the blocking element, remains to be activated in order to prevent the transfer of a new command into the command register together with the final signal of the subordinate program. In the command register the superior command is still present, as explained above. If this final signal appears, the command register is again decoded to the continuous switching chain, conditional elements, and modification elements, the blocking element is canceled, and the operation of the superior program is continued.

I. *Operation*

The technical manner of carrying out a command will be explained whereby the selected command includes numerous features of the invention. The description is grouped into two parts, the first of which is concerned with the organizational phase of the command cycle, and the second of which is concerned with the command selected. The terms "command cycle" or "organizational phase" shall be understood to mean those microoperations which initiate each execution of a command, i.e., obtain the next command from the storage device, modify the same, if necessary, obtain the operands, activate the continuous switching chain, the conditional element, and the modification element, and supervise a possible simultaneous operation.

This organizational phase is preferably provided only once for all commands combined. Within the scope of the above definitions of the terms microprogram and nanoprogram, the organizational phase must be considered as being the latter, because it is not to be assigned to any independent command. Although the organizational phase, because of its special nature, is outside of both of these definitions, if considered systematically, it nevertheless may be activated by the same means, i.e., operation elements, continuous switching chain, etc. and may be described just as the normal programs.

(1) ALGEBRAIC REPRESENTATION OF LOGIC CIRCUITS

For interrogation program and exemplary command, a more simplified manner of representation will be used than heretofore employed. This manner is also used in practice for long and complicated programs, namely, in circuit algebraic representation.

Figure 10:
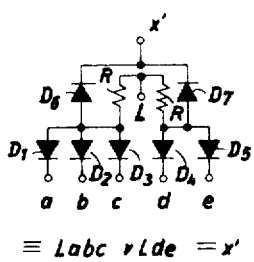
FIGURE 10 is a circuit diagram of the connection or interrelationship between the connecting circuit and the circuit elements illustrated in the drawings.
Figure 12:
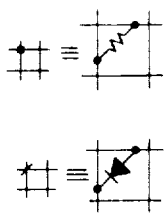
FIGURE 12 is an explanatory view indicating the symbols used in the following drawing to indicate a resistor and a diode.

FIGURE 10 shows a simple logic circuit and indicates the analogy to the circuit algebra. A power element has its output connected to terminal L which is connected with conjunction points via resistors R (conjunction resistors). The outputs $a, b, c, d,$ and $e$ of register elements are connected to the conjunction diodes D1, D2, D3, D4, and D5, respectively, and the input $x'$ of a further operational element (register or power element) is connected to the disjunction diodes D6 and D7. The diodes D1 to D3 form one group and diodes D4, D5 form another group, the groups forming one conjunction, respectively, and these groups are connected by disjunction diodes D6 and D7, respectively. The disjunction resistors of these diodes are in the input circuit of the bistable elements. The diodes D1 to D3 and D4, D5 affect the input of the bistable element ($x'$ in FIGURE 10). Such a logical function is not only illustrated by means of known circuit symbols (FIGURE 10), but it is also represented in the following description in circuit algebraic form, i.e., $x' = Labc \text{ v } Lde$. A conjunction is expressed by means of a multiplication sign (period) between the symbols representing the element outputs, but when the meaning will be clear, the period may be omitted. A disjunction is represented by means of the "or" sign "v" or + between the corresponding element symbols.

(2) DEFINITION OF SYMBOLS IN THE DRAWINGS

In a suitable manner, the wiring of a program controlled parallel computer is provided by matrix plates to form a systematic arrangement, for example. The matrix plates are insulated plates which have groups of parallel conductors printed on both sides. Both groups of conductors are in right angle relationship to each other, and only one group of conductors extends externally by means of contacts or terminals. The matrix plates are provided with circuit components such as resistors and diodes and are connected with plates carrying the circuit elements corresponding thereto in such a manner that terminals of the same type on different matrix plates and element plates are connected with one another. Thus, if the terminal S1 appears on one matrix plate, the output of the power element LS1 present on an element plate is connected with this terminal.

In the representation of circuit elements for the microprograms on matrix plates, the symbols shown in FIG- URE 12 are used. A crossing point between two conductors without any marking means that the conductors are not connected with each other at this point. A crossing point with an oblique line indicates a crystal diode connecting the conductors in such manner that the cathode of the crystal diode is connected with the conductor leading to the element terminals. A dot indicates that a resistor connects the conductors.

(3) IDENTIFICATION OF ELEMENTS

Figure 11:
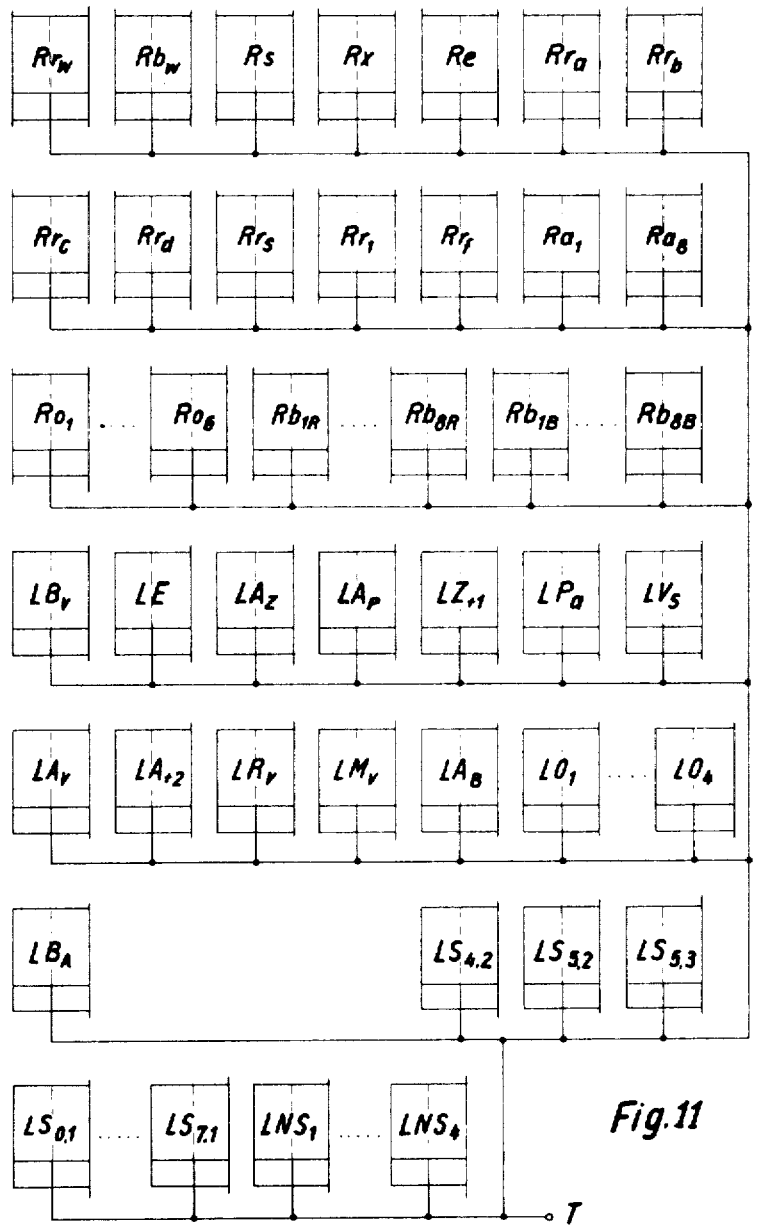
FIGURE 11 is a block diagram of operation elements to be placed on an element plate.

The bistable elements required for performing the programs are shown in FIGURE 11. They may be provided on printed circuit plates at random, as far as their construction is concerned.

The following elements of the command unit 1 of the computer, necessary for illustrating the invention are shown, inter alia: $Ro1 \ldots Ro6$ are six of the bistable elements contained in command register 6; $Ra1$ is an element of the address section 7; and $Rrw$, $Rbw$, $Rs$, $Rx$, $Re$, $Rra$, $Rrb$, $Rrc$, $Rrd$, $Rrs$, $Rrf$, and $Rr1$ are register elements for specific functions which will be described below. The register elements $Rb1R \ldots Rb8R$ and $Rb1B \ldots Rb8B$ are the above-described two groups of conditional elements for selecting individual microprograms. $LS0.1 \ldots LS7.1$ are, respectively, the first members of the eight microprogram continuous switching chains. $LS4.2$, $LS5.2$, and $LS5.3$ are further members of microprogram continuous switching chains. $LNS1 \ldots LNS4$ are the members of a nanoprogram chain which also controls the interrogation program together with the nanoprogram element $RaB$.

In addition, numerous operation power elements are provided which are controlled by the continuous switching chains and which by themselves cause operations in the arithmetic unit or in the command unit, in a known manner, as follows:

$LBv$ causes command pre-decoding for modifying the interrogation program;

$LE$ causes the decoding of the operation code present in the command register to continuous switching chains and conditional elements;

$LAz$ causes transfer of the contents of the command counter into the address section of the command register;

$LAp$ causes a jump into the interrogation program;

$LZ+1$ increases the contents of the command counter;

$LPa$ activates a storage cycle whereby the register elements $Rs$, $Rx$, and $Rrs$ effect the differentiation between the main storage device and the index storage device and/or between reading and writing;

$LVs$ transfers the contents of the storage register 18 into the distributor register 25;

$LAv$ transfers the contents of the distributor register to the command register;

$LRv$ represents an operation of the concluding mixed program but, since the subject of this description is the organization of the course of the program and the technique of connecting one program to another, and this concluding mixed program does not form part of this description, the further operations of this program will be described only in general terms;

$LO1 \ldots LO4$, $LMv$ are further such operations;

$LAB$ causes a transfer from register 9 into the address section 7 of the command register;

$LBA$ causes a transfer in the opposite direction; and $LA+2$ increases the contents of the address section 7 by "two."

(4) OPERATION OF A CONTROL DEVICE

Figure 13:
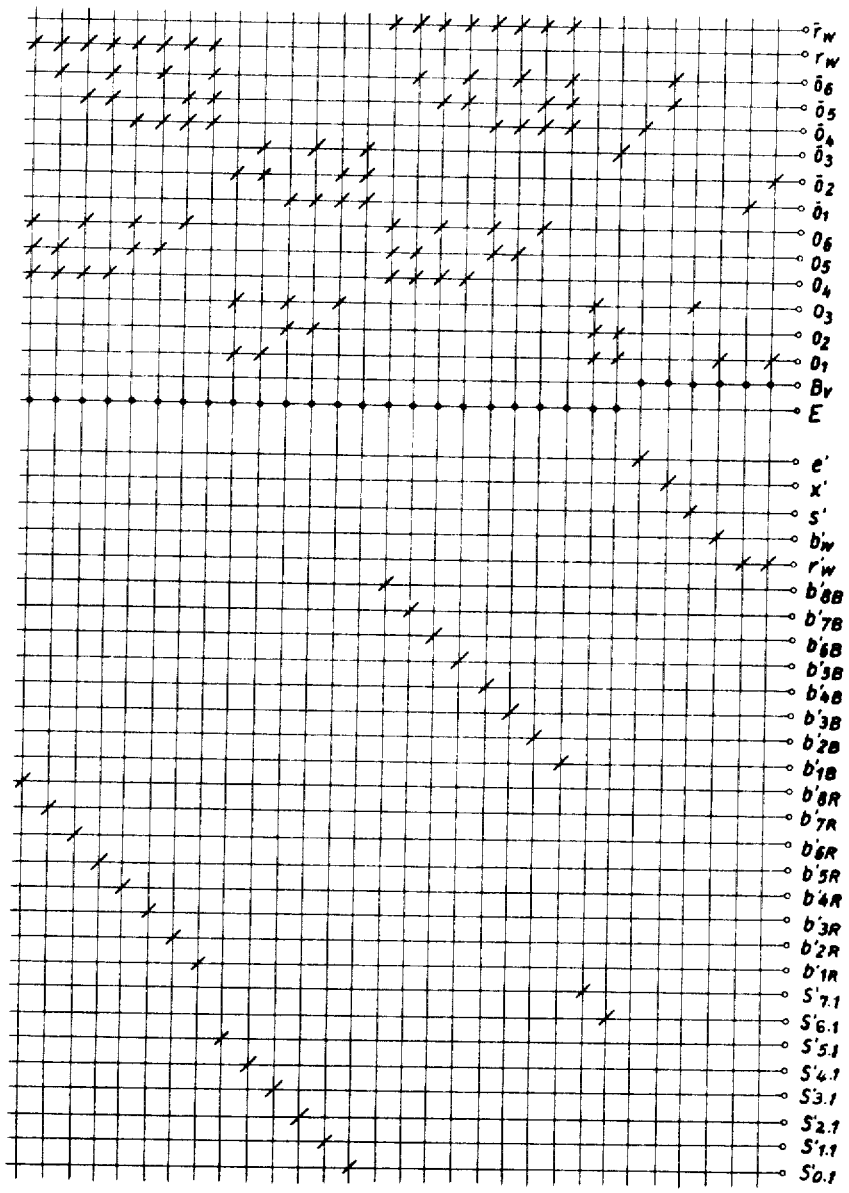
FIGURE 13 is a schematic view of a known decoding circuit provided in matrix form on a matrix plate.

FIGURE 13 shows a matrix having the logical connection for pre-decoding and main decoding in disjunctive normal form.

In Table 1 (see Appendix), this wiring system is represented in circuit algebraic form. If the operation power element $LBv$ is activated, it causes the activation of elements $Rrw$ and/or $Rbw$, depending upon the command code and whether the command present in the command register uses the arithmetic unit ($r'w$), the command unit ($b'w$), or both ($r'w$, $b'w$). Furthermore, the power element sets the element $Rs$ or the element $Rx$ if the operand for the command is to be taken from the main storage device or the index storage device. Finally, the element $Re$ is set if the present command provides for an address substitution. Besides this, Table 1 contains the wiring system of decoding to continuous switching chains and conditional elements. This decoding is caused by the power element $LE$.

The functions shown in Table 1 represent operations which are controlled by the operation elements $LBv$ and $LE$. In the following description this type of representation is not used and only the control of the operation elements is being considered, while the effect of such control is presumed to be known. At the same time, the explicit presentation of the logical function on matrix plates is not provided since, after a consideration of the above explanations, the technical construction may be provided without difficulty from the circuit algebraical representation.

In Table 2 (see Appendix), the central interrogation program which precedes every program is shown. Its function is as follows: The operation power element $LAp$ is controlled by the end of a microprogram, for example, together with one of the program elements $Rra$, $Rrc$, $Rrd$. This power element $LAp$, together with the element $Rra$, provides setting of the nanoprogram element $RaB$ of the interrogation phase in the first cycle of the interrogation program. At the same time, the contents of the command counter is transferred into the address section 7 ($A'z$). In the next cycle, the operation element $LAz$ is activated and is simultaneously effective as a member of this continuous switching chain. It causes the increase of the contents of the command counter ($Z'+1$) and the control of the main storage cycle "read" ($P'a$, $s'$, $\bar{r}'s$).

In the next cycle, $LPa$, which is another operation element, is effective as continuous switching member and provides for a waiting period if the storage cycle is not yet finished ($s$). If the information then is available in the storage register ($\bar{s}$), it is transferred into the distributor register ($V's$). In the next cycle, a normal nanoprogram continuous switching member $LNS1$ is activated and the command present in the distributor register is transferred into the command register ($A'v$). Now, the command may be pre-decoded ($B'v$) and, in the next cycle, the operand may be obtained ($P'a$). However, since $LPa$ was already used as a member of the continuous switching chain, the program automatically again moves on into this loop and transfers a word from the storage device into the distributor register.

Prior to this, the program element $Rrb$ was canceled so that the contents of the distributor register is now no longer transferred into the command register, but is transferred to the continuous switching point $LNS3$. Here, main decoding will follow, i.e., first all conditional elements are put into condition ZERO and in the next cycle $LNS4$ are again set ($E'$). Now, the operand is present in the distributor register and the decoded microprogram may begin.

The process described thus far must be modified if the address of the command register is not a nominal address. For the present example, the substitution command was selected from the many possible modifications. This substitution command was characterized in the command pre-decoding step by setting the register element $Re$, because in that case, in step $LNS2$, the operand was not obtained, but a further command was obtained, which now again must be pre-decoded. For this purpose, the element $Rrb$ which had been inactivated in the preceding step was set again, so that after the storage device control, the contents of the distributor register is again transferred into the command register. Only when a command is no longer a substitution command does the program again proceed into the described final phase.

In the case of simultaneous operation, the interrogation program may have already progressed up to decoding, while, at the same time, another program is still being processed in the arithmetic unit. In such cases, the interrogation program must be channeled into a waiting period or loop ($NS'3 = NS3 \cdot aB \cdot rw \cdot \bar{r}f$). The element $Rrf$ represents that the arithmetic unit is "occupied"; and it will be switched to ONE only when the arithmetic unit is ready to handle a new program. However, if the decoded command is being processed in the command unit ($\bar{r}w$), decoding may follow immediately since the interrogation program itself occupied the command unit. On the other hand, if a command for the arithmetic unit was present ($\bar{b}w$), the next following command may already pass through its interrogation phase, so that upon decoding at LNS4, LAp is already being controlled again.

This interrogation program may also be used as a normal nanoprogram by activating the element LAp by a superior microprogram as will be described below. The point where this occurs is determined by the program element $Rrc$ or $Rrd$. Correspondingly, the pre-decoding or the main decoding are initiated immediately. The interrogation program is used before each execution of a command, and it also serves as an interrogation phase for the following microprogram.

This microprogram is illustrated in Table 3 (see Appendix) and shows the connection of the interrogation program with a program which is being processed in the arithmetic unit and in the command unit. This program is present at the continuous switching chain 4 and is connected with the conditional element $Rb1R$. Furthermore, this microprogram illustrates how a microprogram controls another microprogram. This other microprogram is present, for example, at the continuous switching chain 5 and the conditional element $Rb2R$. The interrogation program, as described, transfers an operand into the distributor register. Then, when the arithmetic unit is unoccupied, it activates the continuous switching chain and conditional element in the main decoding step. The operations $R'v$, $A'B$ and $B'A$ are connected with the first member. These operations exchange the content of register 7 with that of register 9. In register 9, initially the first address of a group of bits of information is present, which is connected with a second group whose first address is present in the register 7. The two addresses are adjacent each other so that the two groups are alternately inserted in the storage device one into the other with the two addresses adjacent. Thus, the operation $R'v$, for example, causes the transfer of the first operand from the distributor register into a first arithmetic register.

In this first cycle, the indication that the arithmetic unit is unoccupied is likewise canceled ($\bar{r}'f$). In the second cycle of this program, a microprogram is activated which processes this operand with the aid of the operation elements LO1, LO2, LO3, LO4. Simultaneously with the move into the microprogram, a move into the interrogation phase again takes place, and the contents of register 7 is increased by two ($A'p$, $rd$, $A'+2$).

According to the invention, the return from the subordinate microprogram into the superior program is now combined with the indication that the arithmetic unit is unoccupied ($r'f$) with the aid of a portion of the interrogation program. The interrogation program was used in step LNS3, i.e., in the main decoding step. There, a waiting period is provided which, for main decoding, is finished when element $Rrf$ is in a certain condition. When the superior program is now again decoded, an operand of the second group with $M'v$ is transferred into a second arithmetic register, since element $Rr1$ was set when the program was carried out the first time, which element was inactivated again at the second cycle.

Thus, alternately an operand of the one group and an operand of the other group is transferred into the respective arithmetic register and is processed in the subordinate microprogram, until the last operands have been processed. The end is indicated, for example, by the element $Ra1$ which is set after the last operand of the second group, by means of further counting in register 7 ($A'+2$). In this case, the interrogation program is used in step $Rb1R$, LS4.2 for taking over a new command.

The example described on the one hand explains the connection of the interrogation program with a microprogram and, on the other hand, explains the connection of a microprogram with a subordinate microprogram. Further, this example discloses the simultaneous operation between independent units of the computer, as well as the substitution of power elements of the continuous switching chain by operation elements.

VI. SUMMARY

All of these possibilities can only be obtained in the control device according to the present invention. They are accomplished by the proper combination of continuous switching chains and conditional elements, which remain unchanged during the entire course of a microprogram. This perforce requires a very logical command decoding, which, moreover, satisfies the requirements with respect to a savings in space or money if the number of the continuous switching chains is approximately chosen to be the same as the number of conditional elements and thus the lattice network of FIGURE 2 is constructed with an approximately square cross section. By introducing the modification elements, the number of the command signals to be decoded is effectively decreased by one or two, since these elements are not interrogated with each step of the program, but only when differences occur in the similar programs. Elements which represent a condition for lengthening, render it possible to provide continuous switching chains with less members.

The nanoprograms effect a shortening of many microprograms, since the contents of a nanoprogram would otherwise have to be inserted into several microprograms. The organization of returning from a nanoprogram into a microprogram by means of a waiting period and/or renewed operation-code-decoding makes possible a flexible application of the nanoprograms and simultaneous operation of a microprogram and a nanoprogram.

The simultaneous operation shortens the computing times with the computer speed remaining the same.

It will be understood that the above description of the present invention is susceptible to various modifications, changes, and adaptations, and the same are intended to be comprehended within the meaning and range of equivalents of the appended claims.

VII. APPENDIX

Table 1

$r'_w = B_v \cdot \bar{O}_1 \vee B_v O_1 \bar{O}_2$; $S' = B_v O_3$; $e' = B_v \cdot \bar{O}_4$ $b'_w = B_v \cdot O_1$; $X' = B_v \cdot \bar{O}_5 \bar{O}_6$ $S'_{0.1} = E \cdot \bar{O}_1 \bar{O}_2 \bar{O}_3$; $S'_{4.1} = E \cdot O_1 \bar{O}_2 \bar{O}_3$ $S'_{1.1} = E \cdot \bar{O}_1 \bar{O}_2 O_3$; $S'_{5.1} = E \cdot O_1 \bar{O}_2 O_3$ $S'_{2.1} = E \cdot \bar{O}_1 O_2 \bar{O}_3$; $S'_{6.1} = E \cdot O_1 O_2 \bar{O}_3$ $S'_{3.1} = E \cdot \bar{O}_1 O_2 O_3$; $S'_{7.1} = E \cdot O_1 O_2 O_3$ $b'_{1R} = E \cdot r_w \cdot \bar{O}_4 \bar{O}_5 \bar{O}_6$; $b'_{5R} = E \cdot r_w \cdot O_4 \bar{O}_5 \bar{O}_6$ $b'_{2R} = E \cdot r_w \cdot \bar{O}_4 \bar{O}_5 O_6$; $b'_{6R} = E \cdot r_w \cdot O_4 \bar{O}_5 O_6$ $b'_{3R} = E \cdot r_w \cdot \bar{O}_4 O_5 \bar{O}_6$; $b'_{7R} = E \cdot r_w \cdot O_4 O_5 \bar{O}_6$ $b'_{4R} = E \cdot r_w \cdot \bar{O}_4 O_5 O_6$; $b'_{8R} = E \cdot r_w \cdot O_4 O_5 O_6$ $b'_{1B} = E \cdot \bar{r}_w \cdot \bar{O}_4 \bar{O}_5 \bar{O}_6$; $b'_{5B} = E \cdot \bar{r}_w \cdot O_4 \bar{O}_5 \bar{O}_6$ $b'_{2B} = E \cdot \bar{r}_w \cdot \bar{O}_4 \bar{O}_5 O_6$; $b'_{6B} = E \cdot \bar{r}_w \cdot O_4 \bar{O}_5 O_6$ $b'_{3B} = E \cdot \bar{r}_w \cdot \bar{O}_4 O_5 \bar{O}_6$; $b'_{7B} = E \cdot \bar{r}_w \cdot O_4 O_5 \bar{O}_6$ $b'_{4B} = E \cdot \bar{r}_w \cdot \bar{O}_4 O_5 O_6$; $b'_{8B} = E \cdot \bar{r}_w \cdot O_4 O_5 O_6$

Table 2

$LA_p$: $A'_{z1}a'_B = A_p r_a$; $NS'_1$, $a'_B = A_p r_c$; $NS'_3$, $a'_B = A_p r_d$ $LA_z$: $Z'_{+1}$, $P'_a$, $S'$, $\bar{r}'_s$, $r'_b = A_z a_B$ $LP_a$: $V'_s = P_a a_B \bar{S}$; $P'_a = P_a a_B S$ $LV_s$: $NS'_1$, $A'_v = V_s \cdot a_B \cdot r_b$; $NS'_3 = V_s \cdot a_B \bar{r}_b$ $LNS_1$: $NS'_2$, $B'_v$, $\bar{r}'_w$, $\bar{b}'_w$, $\bar{e}'$, $\bar{r}'_b = NS_1 \cdot a_B$ $LNS_2$: $r'_b = NS_2 \cdot a_B \cdot e$; $P'_a = NS_2 a_B$ $LNS_3$: $NS'_3 = NS_3 \cdot a_B \cdot r_w \bar{r}_f$;

$S'_4$, $\bar{b}'_{1B}$, $\bar{b}'_{2B}$, $\bar{b}'_{3B}$, $\bar{b}'_{4B}$, $\bar{b}'_{5B}$, $\bar{b}'_{6B}$, $\bar{b}'_{7B}$, $\bar{b}'_{8B}$
$= NS_3 \cdot a_B \bar{r}_w$ $NS'_4$, $\bar{b}'_{1R}$, $\bar{b}'_{2R}$, $\bar{b}'_{3R}$, $\bar{b}'_{4R}$, $\bar{b}'_{5R}$, $\bar{b}'_{6R}$, $\bar{b}'_{7R}$, $\bar{b}'_{8R}$
$= NS_3 a_B r_w r_f$

Table 3

$Rb_{1R}$, $LS_{4.1}$: $R'_v$, $\bar{r}'_f$, $r'_1$, $A'_B$, $B'_A$, $S'_{4.2}$
$= S_{4.1} b_{1R} \bar{r}_1$; $M'_v$, $\bar{r}'_1$, $A'_B$, $B'_A$, $S'_{4.2}$
$= S_{4.1} \cdot b_{1R} r_1$ $Rb_{1R}$, $LS_{4.2}$: $S'_{5.1}$, $\bar{b}'_{1R}$, $b'_{2R} = S_{4.2} \cdot b_{1R} \bar{r}_1$; $A'_p$, $r'_d$, $A'_{+2}$
$= S_{4.2} \cdot b_{1R} \bar{a}_1$; $A'_p$, $r'_a = S_{2.3} b_{1R} a_1$ $Rb_{2R}$, $LS_{5.1}$: $O'_1$, $O'_2$, $S'_{5.2} = S_{5.1} \cdot b_{2R}$ $Rb_{2R}$, $LS_{5.2}$: $O'_3$, $S'_{5.3} = S_{5.2} \cdot b_{2R}$ $Rb_{2R}$, $LS_{5.3}$: $O'_4$, $r'_f = S_{5.3} \cdot b_{2R}$

What is claimed is:

1. In a microprogram control device of a program controlled digital computer with bistable operation elements, which when activated initiate corresponding elemental operations, and with a command register in a command unit of the computer, in which an N-digit command to be carried out is stored, and, if desired, one or more information addresses are stored in the form of binary command signals, the command register being arranged so that generally one command controls, via a decoding device, the activation of a whole microprogram, wherein a microprogram comprises a number of selected operation elements activated in a number of sequential steps which immediately follow one another, the decoding device comprising several switching chains made up of bistable chain elements which in turn activate the selected operation elements, each switching chain having a first chain element activated by decoding a first group of $n$ command signals, and having further chain elements each being activated when the preceding chain element is deactivated, the improvement that the decoding device includes $2^n$ switching chains each being connected to activate a group of $2^{N-n}$ microprograms, and $2^{N-n}$ bistable conditional elements arranged such that each conditional element is correlated with one microprogram of each of the groups so that one of $2^N$ microprograms is selected by selecting the first member of one of the $2^n$ switching chains in dependence upon a first partial group of $n$ command signals and by selecting at least one of $2^{N-n}$ conditional elements which is activated in dependence upon the second partial group of $N-n$ command signals and remains activated during the performance of the command.

2. A microprogram control device for a computer, comprising, in combination:
   a command register for containing an N-digit command to be performed and dipossed in two groups, a first group providing $n$ command signals, and a second group providing $N-n$ command signals;
   a plurality of bistable operation elements which when activated initiate corresponding elemental operations in the computer and thus form a microprogram;
   a decoding device for each group of command signals, respectively, and connected to said command register;
   $2^n$ switching chains connected with the decoding device pertaining to the first group of command signals and arranged with said decoding device so that the first group of command signals determine which switching chain is to have its members sequentially activated;
   $2^N$ microprograms connected with said switching chains and having $2^{N-n}$ microprograms are connected to each switching chain, said microprograms including said plurality of operation elements activated in a number of sequential steps which immediately follow one another; and
   $2^{N-n}$ bistable conditional elements activated by the decoding device pertaining to the second group of command signals and being arranged so that the second group of command signals determines for each chain which of the microprograms connected to the chain is to be activated by selecting at least one of said conditional elements for activation, whereby the sequential activation of the chain sequentially activates the operational elements of the selected microprogram.

3. A control device as defined in claim 2 wherein said conditional elements and decoding device are arranged so that a number ($b$) of the second group ($N-n$) of command signals activates one of $2^b$ conditional elements, each conditional element on each switching chain being assigned to several microprograms with essentially the same sequence of elemental operations, and the other $N-n-b=m$ command signals activate at least one conditional element as a modification element which is only interrogated, as an additional condition, when the course of operation of the similar microprograms is different.

4. A control device as defined in claim 2 wherein the microprograms are connected to the switching chains in an arrangement such that at least one of the switching chains only controls microprograms which in turn control an operating unit of the computer which operates independently of the other units of the computer, and said device further comprising means to take over, in such cases, a further command and to process the same at the same time to provide for simultaneous operation.

5. A device as defined in claim 4 wherein said independently operating unit is an arithmetic unit.

6. A control device as defined in claim 4 wherein the conditional elements are provided in duplicate, and at least one bistable element is provided which is set when simultaneous operation in several units of the computer which operate independently from one another is possible, so that one of the groups of the conditional elements accepts only independent commands and is effective upon switching chains, which carry out the microprograms in an independently working unit, while the other group of the conditional elements cooperates with the other switching chains and is assigned to the other commands.

7. A control device for a computer, comprising, in combination:
   a command register for containing an N-digit command to be performed and disposed in two groups, a first group providing $n$ command signals, and a second group providing $N-n$ command signals;
   a decoding device for each group of command signals, respectively, and connected to said command register;
   a plurality of operation elements each being arranged when activated to initiate a predetermined elemental operation in the computer, selected groups of said operation elements being disposed to form microprogram assemblies for initiating different sequences of elemental operations which form a microprogram;
   $2^n$ switching chains connected with the decoding device pertaining to the first group of command and arranged with said decoding device so that the first group of command signals determine which switching chain is to have its members sequentially activated;
   $2^N$ microprogram assemblies connected with said switching chains and having $2^{N-n}$ microprogram assemblies connected to each switching chain, and $2^{N-n}$ bistable conditional elements connected with the decoding device pertaining to the second group of command signals and each connected with $2^n$ microprogram assemblies which are in turn each connected with a different switching chain, said conditional elements being arranged with said decoding device so that the second group of command signals determine which conditional element is to be activated, whereby activation of a conditional element and a switching chain selects one of the $2^N$ microprogram assemblies to be performed and the sequential activation of the chain sequentially activates the operation elements of the selected microprogram assembly.

8. A control device as defined in claim 7 wherein all switching chains have the same number of members, said device further comprising at least one bistable chain connection element for microprogram assemblies requiring additional chain members, the chain connection element being arranged to be activated by the last member of the first chain and effective as a conjunctive additional condition when subsequently another activation of a chain takes place.

9. A control device as defined in claim 7 comprising at least one further switching chain connected to be activated by a member of one of the microprogram continuous switching chains and which is arranged to initiate sequences of elemental operations forming frequently used sub-routines or nanoprograms.

10. A control device as defined in claim 9 comprising a plurality of bistable nanoprogram elements for performing and selecting several nanoprograms with one nanoprogram switching chain, and arranged so that at least one of the nanoprogram selecting elements is set by a respective superior microprogram assembly and is again inactivated in the last step of the nanoprogram.

11. A control device as defined in claim 10 wherein said microprogram assemblies and said nanoprogram elements are arranged so that in a condition of the elements of a microprogram following a jump into a nanoprogram the condition of the set nanoprogram selecting element is interrogated and, in dependence upon this, the microprogram continues.

12. A control device as defined in claim 9 comprising a plurality of nanoprogram elements arranged so that nanoprograms with few elemental operations which are different from each other are effected by actuating the nanoprogram element corresponding to the first elemental operation of the nanoprogram and an actauted bistable element cooperating with the actuated nanoprogram element for effecting under the conjunctive condition a continuous switching out of the switching chain.

13. A control device as defined in claim 10 wherein said nanoprogram elements are arranged so that a nanoprogram is modified in dependence upon conditions which are set in the superior microprogram by means of at least one bistable element and which is interrogated during the course of the nanoprogram.

14. A device as defined in claim 10 comprising elements forming a special nanoprogram for performing an interrogation program said elements being connected to the elements of at least one of said microprogram assemblies for providing organization routines which precede the execution of a command, said elements of the special nanoprogram being activated by the elements of said microprogram assemblies in a time relationship with respect to the preceding microprogram.

15. A device as defined in claim 14 wherein said special nanoprogram elements are arranged to be activated during activation of the preceding microprogram.

16. A device as defined in claim 14 wherein said special nanoprogram elements are arranged to be activated at the end of the preceding microprogram.

17. A control device as defined in claim 14 wherein the said special nanoprogram elements are also connected with the command register and the actuation of said special nanoprogram elements is modified in dependence upon conditions which are obtained from the command code in the command register by means of predecoding.

18. A control device as defined in claim 14 wherein a microprogram is controlled by another microprogram by providing circuit means including conditional, modification, and blocking elements connected thereto so that switching chains, conditional and modification elements are canceled by the condition of elements of a superior microprogram and in place of those, conditional and modification elements as well as switching chains of the microprogram to be controlled are set and simultaneously the blocking element is activated by the condition of elements of the superior microprogram, which, in the special nanoprogram controlled by the subordinate microprogram after the latter has run its course, prevents the transfer of the next command into the command register and effects switching back to the superior microprogram by once more decoding its operational code which is still present in the command register, whereby the blocking element differentiates the second from the first course in the superior microprogram.

19. A control device as defined in claim 14 wherein some of the special nanoprogram elements are arranged to be used by a microprogram as nanoprogram, a separate operation elements being provided for setting the nanoprogram element and the corresponding element of the continuous switching chain of the special nanoprogram and the jump into the superior microprogram is effected by the decoding of the command code which decoding ends the special nanoprogram.

20. A control device as defined in claim 19 comprising individual independently operating units, each having a bistable element for indicating its condition of occupation and said units being connected to have the program therefor run through waiting loops if a unit already occupied is controlled by a simultaneously operated program.

21. A control device for a computer, comprising, in combination:

a command register for containing an N-digit command to be performed and disposed in two groups, a first group providing $n$ command signals, and a second group providing $N-n$ command signals;

a decoding device for each group of command signals, respectively, and connected to said command register;

a plurality of bistable elements arranged for initiating predetermined elemental operations when in the activated condition, selected groups and said bistable elements being arranged to form microprograms for initiating different sequences of elemental operations which form a microprogram;

$2^n$ program controlled continuous switching chains connected with the decoding device pertaining to the first group of command signals and arranged with said decoding device so that the first group of command signals determine which switching chain is to have its members sequentially activated;

$2^N$ microprograms connected with said switching chains and having $2^{N-n}$ microprograms connected to each switching chain; and $2^{N-n}$ bistable conditional elements connected with the decoding device pertaining to the second group and each connected with $2^n$ microprograms which are in turn each connected with a different switching chain, said conditional elements being arranged with said decoding device so that the second group of command signals determine which conditional element is to be activated, whereby activation of a conditional element and a switching chain selects one of the $2^N$ microprograms to be performed and the sequential activation of the chain sequentially activates the bistable elements of the selected microprogram, and the number of chains and conditional elements being the same and representing an exponent of 2.

22. A control device for a computer, comprising, in combination:
- a register capable of containing an N-digit command signal divided into a first group of $n$ binary digits and a second group of $N-n$ binary digits;
- $2^n$ switching chains each having a plurality of actuating elements which, upon triggering of the first actuating element, are sequentially triggered, said switching chains being connected to so much of said register which pertains to said first group of binary digits so that the $n$ digits of said first group are determinative of which switching chain is selected;
- $2^{N-n}$ conditional elements connected to so much of said register which pertains to said second group of binary digits so that the $N-n$ digits of said second group are determinative of which conditional element is selected; and
- $2^N$ microprograms arranged in an imaginary $2^n$ by $2^{N-n}$ matrix so that selection of a given switching chain by said first group and selection of a given conditional element by said second group is determinative of one microprogram, each microprogram having a plurality of elements corresponding in number to the number of elements in said switching chains, the elements of said microprograms being connected to respective elements of said switching chains and actuated thereby so that upon the running through of a particular switching chain, the determined microprogram is caused to run through.

23. In a program controlled digital computer having a command register which contains at least N digits for the storing of a command which releases the operation portions in a microprogram, a microprogram control unit for the execution of microprograms, each of which comprises a number of partly simultaneously, partly subsequently performed elemental operations, which operations are released by an operation element corresponding thereto said microprogram unit comprising:
- $2^n$ switching chains wherein $n<N$, each comprising several chain members each formed by a bistable element, the first chain member of which is activated when a microprogram is called by the command register, the remaining members of the chain being activated sequentially when the preceding member is deactivated so that always only one chain member is activated;
- $2^{N-n}$ bistable conditional elements;
- a first decoding circuit with $n$ inputs which are connected to $n$ of the N digits of the command register, and with $2^n$ outputs, each of which is connected to one chain member of the $2^n$ switching chains;
- a second decoding circuit with $N-n$ inputs which are connected to the remaining $N-n$ inputs of the N digits of the command register, and with $2^{N-n}$ outputs which are connected to the inputs of said $2^{N-n}$ conditional elements; and
- a plurality of operation elements, each having an input which is connected to the output of at least one chain member of the continuous switching chain via and AND-circuit, and to the output of at least one conditional element.

References Cited by the Examiner
UNITED STATES PATENTS 3,039,690    6/1962    Yandell    340—172.5

ROBERT C. BAILEY, *Primary Examiner.*

G. D. SHAW, *Assistant Examiner.*